United States Patent
Nakamura et al.

(10) Patent No.: US 6,713,197 B2
(45) Date of Patent: Mar. 30, 2004

(54) PERPENDICULAR MAGNETIC RECORDING MEDIUM AND MAGNETIC RECORDING APPARATUS

(75) Inventors: Futoshi Nakamura, Yamato (JP); Takashi Hikosaka, Tokyo (JP); Soichi Oikawa, Yokohama (JP); Hideo Ogiwara, Tachikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/808,426

(22) Filed: Mar. 15, 2001

(65) Prior Publication Data

US 2002/0028355 A1 Mar. 7, 2002

(30) Foreign Application Priority Data

Jul. 19, 2000 (JP) .......................... 2000-219447
Sep. 12, 2000 (JP) .......................... 2000-275890

(51) Int. Cl.$^7$ .............................. G11B 5/66; G11B 5/70
(52) U.S. Cl. .................. 428/694 TM; 428/694 TS; 428/212; 428/336; 428/900
(58) Field of Search ............... 428/694 TS, 694 TM, 428/212, 336, 900, 694 TB

(56) References Cited

U.S. PATENT DOCUMENTS

| | | | |
|---|---|---|---|
| 4,603,091 A | 7/1986 | Mukasa et al. | 428/611 |
| 4,675,224 A | 6/1987 | Hosokawa | 428/65 |
| 4,687,712 A * | 8/1987 | Sugita et al. | 428/611 |
| 5,304,878 A * | 4/1994 | Oda et al. | 310/67 R |
| 5,543,221 A * | 8/1996 | Kitakami et al. | 428/332 |
| 5,589,262 A * | 12/1996 | Kiuchi et al. | 428/336 |
| 5,792,564 A | 8/1998 | Hikosaka et al. | 428/610 |
| 5,830,569 A * | 11/1998 | Hikosaka et al. | 428/332 |
| 5,933,297 A | 8/1999 | Hoshiya et al. | 360/113 |
| 5,942,342 A | 8/1999 | Hikosaka et al. | 428/694 R |
| 6,270,885 B1 * | 8/2001 | Hokkyo et al. | 428/332 |
| 6,468,670 B1 * | 10/2002 | Ikeda et al. | 428/611 |

FOREIGN PATENT DOCUMENTS

| | | | |
|---|---|---|---|
| JP | 2690893 | | 10/1988 |
| JP | 01-128226 A | * | 5/1989 |
| JP | 2568592 | | 5/1989 |
| JP | 8-45068 | | 2/1996 |

* cited by examiner

Primary Examiner—Holly Rickman
(74) Attorney, Agent, or Firm—Pillsbury Winthrop LLP

(57) ABSTRACT

A soft magnetic laminate layer is arranged between a nonmagnetic substrate and a perpendicular magnetic recording layer so as to provide a perpendicular magnetic recording medium low in noise and capable of a high density recording. The soft magnetic laminate layer comprises a soft magnetic layer having a thickness not larger than 500 Å and a nonmagnetic layer, comprises a first soft magnetic layer and a second soft magnetic layer differing from the first soft magnetic layer in the crystal structure, or comprises a layer of a granular structure consisting of magnetic particles and a nonmagnetic matrix and a soft magnetic layer.

18 Claims, 7 Drawing Sheets

PERPENDICULAR MAGNETIC RECORDING MEDIUM AND MAGNETIC RECORDING APPARATUS

CROSS-REFERENCE TO RELATED APPLICATIONS

This application is based upon and claims the benefit of priority from the prior Japanese Patent Applications No. 2000-219447, filed Jul. 19, 2000; and No. 2000-275890, filed Sep. 12, 2000, the entire contents of both of which are incorporated herein by reference.

BACKGROUND OF THE INVENTION

The present invention relates to a magnetic recording apparatus and a magnetic recording medium used in the magnetic recording apparatus.

In recent years, a magnetic recording medium come to be required in higher recording density, particularly, the fields of the hard disc drive (HDD) and the digital voice tape recorder (DVTR) in accordance with progress in the performance of a computer, and use of the digital system and progress in the quality of the image-voice.

For example, if it is intended to achieve a high recording density by making finer the recording bits in the ordinary longitudinal recording, that the coercive force is made higher than the thermal decay of the recording magnetization and a problem that the coercive force is too high to record is generated. In order to avoid the problem, in recent years, a perpendicular magnetic recording system using a perpendicular magnetic recording layer having a perpendicular anisotropy is proposed.

In the perpendicular magnetic recording system, a perpendicular magnetic recording medium comprising a magnetic recording layer having an easy axis of magnetization in a thickness (perpendicular) direction of the magnetic recording medium. Signals can be recorded by a perpendicular magnetic recording head with a strong magnetization distribution in the thickness direction to the magnetic recording medium so as to magnetize the perpendicular magnetic recording medium in the thickness direction and to allow the magnetization to remain.

A known perpendicular magnetic recording medium includes a single layer structure in which a single perpendicular magnetic recording layer is formed on a substrate and a double layer structure in which a soft magnetic underlying layer of a high permeability and a perpendicular magnetic recording layer are formed on a substrate. As disclosed in, for example, Japanese Patent Disclosure (Kokai) No. 52-78403, it is known to the art that the mutual function between the magnetic head and the soft magnetic underlying film allows the perpendicular magnetic recording medium of the double layer structure to exhibit excellent recording characteristics, compared with the perpendicular magnetic recording medium of the single layer structure.

It is desirable for the soft magnetic underlying layer to exhibit a high permeability and a high saturated magnetic flux density. However, if the recording test is conducted by using the perpendicular magnetic recording medium of the double layer structure, a spike-like noise is observed. The spike-like noise is not observed when it comes to the perpendicular magnetic recording medium of the single layer structure consisting of the perpendicular magnetization film alone. As disclosed in Japanese Patent Publication (Kokoku) No. 3-53686, the noise is not uniformly generated within the medium. It is known to the art that the spike-like noise is generated in the portion where a domain wall is present, and is not generated in the portion where a domain wall is not present. The noise, which is called a Barkhausen noise, is derived from the phenomenon that the domain wall migration takes place irreversibly. Generation of the Barkhausen noise can be suppressed by employing the construction that permits suppressing the domain wall migration within the soft magnetic film, which is positioned below the perpendicular magnetization film, or permits completely eliminating the domain wall.

The noise generated within the magnetic recording medium also includes a white noise derived from the film characteristics of the magnetic recording medium in addition to the spike-like noise described above. In order to obtain a sufficient S/Nm, it is also necessary to improve the white noise.

BRIEF SUMMARY OF THE INVENTION

A first object of the present invention is to provide a perpendicular magnetic recording medium low in noise and capable of a high density recording.

A second object of the present invention is to provide a perpendicular magnetic recording apparatus low in noise and capable of a high density recording.

According to a first aspect of the present invention, there is provided a magnetic recording medium comprising:
 a nonmagnetic substrate;
 a perpendicular magnetic recording layer for recording signal; and
 a soft magnetic laminate layer including a soft magnetic layer which has a thickness not larger than 500 Å and a nonmagnetic layer formed between a nonmagnetic substrate and a perpendicular magnetic recording layer for recording signal.

According to a second aspect of the present invention, there is provided a magnetic recording medium comprising:
 a nonmagnetic substrate;
 a perpendicular magnetic recording layer;
 a soft magnetic laminate layer formed between the nonmagnetic substrate and the perpendicular magnetic medium, including a first soft magnetic layer, and a second soft magnetic layer laminated on the first soft magnetic layer and differing from the first soft magnetic layer in the crystal structure.

According to a third aspect of the present invention, there is provided a magnetic recording medium comprising:
 a nonmagnetic substrate;
 a perpendicular magnetic recording layer;
 a soft magnetic laminate layer formed between the nonmagnetic substrate and the perpendicular magnetic medium, including a soft magnetic granular layer formed of a nonmagnetic matrix and soft magnetic metal particles dispersed in the matrix, and a soft magnetic layer.

According to a fourth aspect of the present invention, there is provided a magnetic recording apparatus, comprising:
 a magnetic recording medium having a nonmagnetic substrate, a soft magnetic laminate layer formed on the nonmagnetic substrate, and a perpendicular magnetic recording layer formed on the soft magnetic laminate layer;
 driving means supporting and rotating the perpendicular magnetic recording medium;

a magnetic head including an element for recording information in the perpendicular magnetic recording medium and another element for reading the recorded information; and a carriage assembly supporting the magnetic head such that the magnetic head is movable relative to the magnetic recording medium.

According to a fifth aspect of the present invention, there is provided a magnetic recording apparatus comprising:

a magnetic recording medium having a nonmagnetic substrate, a perpendicular magnetic recording layer, a soft magnetic laminate layer formed between the nonmagnetic substrate and the perpendicular magnetic medium, including a first soft magnetic layer, and a second soft magnetic layer laminated on the first soft magnetic layer and differing from the first soft magnetic layer in the crystal structure;

driving means supporting and rotating the perpendicular magnetic recording medium;

a magnetic head including an element for recording information in the perpendicular magnetic recording medium and another element for reading the recorded information; and a carriage assembly supporting the magnetic head and making the magnetic head be movable relative to the magnetic recording medium.

According to a sixth aspect of the present invention, there is provided a magnetic recording apparatus comprising:

a magnetic recording medium having a nonmagnetic substrate, a perpendicular magnetic recording layer, a soft magnetic laminate layer formed between the nonmagnetic substrate and the perpendicular magnetic medium, including a soft magnetic granular layer formed of a nonmagnetic matrix and soft magnetic metal particles dispersed in the matrix, and a soft magnetic layer;

driving means supporting and rotating the perpendicular magnetic recording medium;

a magnetic head including an element for recording information in the perpendicular magnetic recording medium and another element for reading the recorded information; and a carriage assembly supporting the magnetic head and making the magnetic head be movable relative to the magnetic recording medium.

According to the present invention, the soft magnetic laminate layer is used as a magnetic layer so that generation of the domain wall in the soft magnetic layer can be prevented so as to suppress the noise generation from the soft magnetic layer, thereby providing a perpendicular magnetic recording medium low in noise and capable of a high density recording.

Also, according to the present invention, the noise generation from the soft magnetic layer is suppressed by the use of the particular perpendicular magnetic recording medium so as to provide a perpendicular magnetic recording apparatus low in noise and capable of a high density recording.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
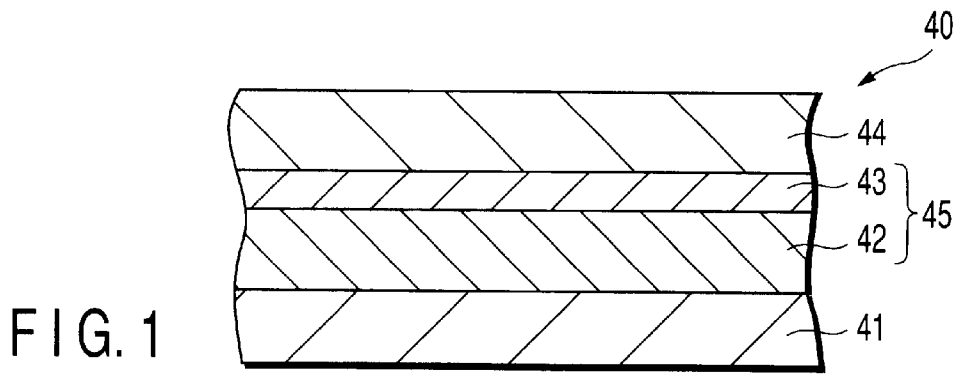
FIG. 1 is a view showing the construction of a first example of the magnetic recording medium of the present invention.

The perpendicular magnetic recording medium of the present invention comprises in principle a nonmagnetic substrate, a predetermined soft magnetic laminate layer formed on the nonmagnetic substrate, and a perpendicular magnetic recording layer formed on the soft magnetic laminate layer.

A preferred soft magnetic laminate layer comprises at least one of the first to third soft magnetic laminate bodies described below.

Specifically, the first soft magnetic laminate layer comprises a nonmagnetic layer and a soft magnetic layer having a thickness not larger than 500 Å. The second soft magnetic laminate layer comprises a first soft magnetic layer and a second soft magnetic layer differing from the first soft magnetic layer in the crystal structure. Further, the third soft magnetic laminate layer comprises a granular layer composed of a nonmagnetic matrix and soft magnetic metal particles dispersed in the nonmagnetic matrix, and a soft magnetic layer, the granular layer is arranged the perpendicular magnetic recording layer.

On the other hand, the perpendicular magnetic recording apparatus of the present invention, to which the above magnetic recording medium of the present invention is applied, comprises a perpendicular magnetic recording medium having a nonmagnetic substrate, a soft magnetic laminate layer formed on the nonmagnetic substrate, and a perpendicular magnetic recording layer formed on the soft magnetic laminate layer; driving means supporting and rotating the perpendicular magnetic recording medium; a magnetic head including an element to write signal in the perpendicular magnetic recording medium and another element to read the recorded signal; and a carriage assembly supporting the magnetic head such that the magnetic head is movable relative to the perpendicular magnetic recording medium.

According to the present invention, a predetermined soft magnetic laminate layer is arranged between the nonmagnetic substrate and the perpendicular magnetic recording layer so as to suppress the generation of the domain wall and, thus, to suppress the noise generated from the soft magnetic layer.

In the first soft magnetic laminate layer of the present invention, the soft magnetic layer and the nonmagnetic layer are laminated one upon the other a plurality of times, as required.

In the second soft magnetic laminate layer of the present invention, the first soft magnetic layer and the second soft magnetic layer are laminated one upon the other a plurality of times, as required. It is also possible to use another soft magnetic layer differing from the first and second soft magnetic layers in the crystal structure.

Further, in the third soft magnetic laminate layer of the present invention, the granular layer and the soft magnetic layer are laminated one upon the other a plurality of times, as required.

It is possible to further laminate the first to third soft magnetic laminate bodies in combination as required, though, in the case of using the third soft magnetic laminate layer, it is necessary to arrange the third soft magnetic laminate layer such that the granular layer is positioned adjacent to the magnetic recording layer.

In such first and second soft magnetic laminate bodies, a nonmagnetic layer is interposed between adjacent soft magnetic layers so as to break the continuity of the crystal structure between the soft magnetic layers. Also, the soft magnetic laminate layer is interposed between the nonmagnetic substrate and the perpendicular magnetic recording layer. The particular construction permits weakening the co-relation in the perpendicular direction of the soft magnetic layers of the magnetic recording medium, permits maintaining the characteristics of each soft magnetic layer, and permits suppressing the generation of domain wall so as to suppress the noise generation from the soft magnetic layers.

In the third soft magnetic laminate layer, the granular layer is formed for suppressing the domain wall generation. As a result, the correlation between magnetic particles in the longitudinal direction of the soft magnetic layers of the magnetic recording medium is weakened. It is considered reasonable to use ferromagnetic particles of Co, CoPt, etc. having a high Hk value, which particle diameter is decreased close to a superparamagnetism particle, as the magnetic material contained in the granular layer. These ferromagnetic particles do not form domain walls, but greatly affect the recording process of the magnetic recording layer, resulting in failure to form a bit pattern. Such being the situation, magnetic particles having a relatively small Hk value are used in the present invention. Further, in the present invention, these magnetic particles covered with a nonmagnetic matrix is effective to achieve a good smoothness of the surface of a magnetic recording layer. However, in the magnetic recording layer of this type, density of the magnetic particles is diluted by the presence of the nonmagnetic matrix, with the result that the average saturation magnetic flux density Bs of the magnetic layer is lowered, compared with the continuous magnetic recording layer. Therefore, in the present invention, a soft magnetic continuous layer is further laminated on the granular layer so as to increase the saturation magnetic flux density Bs.

Because of the particular construction, the magnetic flux coming from the main pole of the head is concentrated on the magnetic particle portion of the granular layer having a high permeability and passes through the lower continuous magnetic film without passing through the nonmagnetic matrix between adjacent particles so as to return to the return pole of the head. It follows that it is possible to obtain highly concentrate magnetic flux in the magnetic particle in the soft magnetic layer.

Further, the second soft magnetic laminate layer produces the merit that the Mst value is rendered higher than that of the first soft magnetic laminate layer in which the same number of soft magnetic layers and nonmagnetic layers are laminated one upon the other.

If the thickness of the soft magnetic layer in the first soft magnetic laminate layer exceeds 500 Å, fail to suppress the noise sufficiently result in a bad S/Nm of perpendicular recording medium. It is desirable for the thickness of the soft magnetic layer to fall within a range of between 50 Å and 200 Å.

The thickness of the nonmagnetic layer in the first soft magnetic laminate layer should preferably be not larger than 1.5 times the thickness of the soft magnetic layer, more preferably 0.2 to 1.0 times the thickness of the soft magnetic layer. If the thickness of the nonmagnetic layer exceeds 1.5 times the thickness of the soft magnetic layer, it is difficult to obtain the effect of preventing the domain wall generation.

If the soft magnetic layer has a thickness not larger than 500 Å, the domain wall is converted into a Neel wall. If the thickness of the nonmagnetic layer is not larger than 1.5 times the thickness of the soft magnetic layer, the distance between adjacent soft magnetic layers is not rendered unduly large particularly where a plurality of nonmagnetic layers and soft magnetic layers are alternately laminated one upon the other. If the thickness of each of the soft magnetic layer and the nonmagnetic layer falls within the range specified in the present invention, the Neel wall coupling is generated between the adjacent soft magnetic layers so as to decrease the internal energy and, thus, to cause the domain wall not to be sharp. As a result, it is possible to suppress the noise when the R/W characteristics are measured.

The Neel wall coupling between adjacent soft magnetic layers also takes place in the second soft magnetic laminate layer so as to decrease the internal energy and, thus, to cause the domain wall not to be sharp, thereby suppressing the noise generation.

The entire thickness of the first or second soft magnetic laminate layer should preferably fall within a range of between 500 Å and 4,000 Å, more preferably should be about 2,000 Å.

The saturation magnetization per layer of the soft magnetic layers used in the first or second soft magnetic laminate layer should preferably be not higher than 90% of the saturation magnetization of the soft magnetic layer under the state of bulk. In this case, each soft magnetic layer is in the state close to the structure in which the magnetic particles are separated from each other. Since the magnetic particles are separated from each other, the coercive force is diminished and, thus, the domain wall is unlikely to be generated.

The nonmagnetic substrate can be made from, for example, glass, aluminum, silicon, plastic materials, and synthetic resins. The substrate can be in any shape of a disc, a tape or a drum.

Each of the soft magnetic layer and the perpendicular magnetic recording layer can be formed by a physical vapor deposition method such as a sputtering method, a vacuum evaporation method.

The perpendicular magnetic recording layer is formed of a ferromagnetic material containing at least one element selected from Co, Fe and Ni. For example, the perpendicular magnetic recording layer contains combination of CoPtCr, CoCrTa, CoTaPt, CoNiTa, CoPt or oxide thereof.

It is desirable for the soft magnetic layer used in the first or second soft magnetic laminate layer to contain as a main component at least one element selected from Fe, Co and Ni. On the other hand, it is desirable for the nonmagnetic layer used in the first soft magnetic laminate layer to contain at least one element selected from the group consisting of B, C, Ti, Si, Al, Cr, Ru, Zr, Nb, and Ta.

The soft magnetic layer used in the third soft magnetic laminate layer is formed of a soft magnetic material containing at least one element selected from Co, Fe and Ni. For example, the particular soft magnetic layer is formed of CoFe, NiFe or CoZnNb.

The nonmagnetic matrix of the granular layer is formed of a nonmagnetic metal such as Ag, Ti, Ru or C or its compound as well as an oxide, a nitride, a fluoride or a carbide such as $SiO_2$, SiO, $Si_3N_4$, $Al_2O_3$, AlN, TiN, BN, $CaF$, or TiC.

Particularly, in the case of the nonmagnetic matrix or the surface layer or the soft magnetic laminate layer is formed of a material which can play the roles of controlling the crystallinity and the orientation of the perpendicular magnetic recording medium such as Ti or TiN, it is possible to diminish the underlayer of the perpendicular magnetic recording layer in order to improve the efficiency of the soft magnetic laminate layer as an underlying film and to permit a high density recording. It is also possible to arrange an intermediate layer of Ti, a nonmagnetic CoCr, etc. which control the crystallinity and the orientation of the perpendicular magnetic recording layer between the soft magnetic laminate layer and the perpendicular magnetic recording layer.

A Fe—Al—Si alloy soft magnetic laminate layer prepared by laminating a Fe—Al—Si alloy magnetic layer having a thickness not larger than 500 Å on a nonmagnetic substrate with a nonmagnetic layer interposed between constitutes a further preferred example of the first soft magnetic laminate layer. The Fe—Al—Si alloy magnetic layer has a good stability again applied magnetic field and, thus, is stable in its output. Also, since the domain wall is not formed in the Fe—Al—Si alloy magnetic layer, the spike noise is not generated. However big domain walls are not generated, the Fe—Al—Si alloy magnetic layer shows the noise derived from the fine domain walls in size of about 1 to 10 $\mu$m is generated as a white noise, and so not suitable for the underlayer of the perpendicular magnetic recording media in the practical use. In the present invention, however, the Fe—Al—Si alloy magnetic thin films are laminated to erase the fine domain walls, and succeeded in suppressing the noise generation. It follows that the present invention provides a soft magnetic layer exhibiting the characteristics of the Fe—Al—Si alloy magnetic thin film and capable of further suppressing the noise generation.

The present invention also provides a further improved perpendicular magnetic recording medium prepared by laminating at least one Co—Pt—Cr—O series perpendicular magnetic recording layer on a Fe—Al—Si alloy soft magnetic laminate layer prepared by laminating a Fe—Al—Si alloy magnetic thin film thinner than 500 Å and a nonmagnetic thin film alternately on a nonmagnetic substrate. The Co—Pt—Cr—O series perpendicular magnetic recording layer is a recording medium with small demagnetization and excellent thermal stability, as described in "The 2000 IEEE International Magnetic Conference DP-05". When the Co—Pt—Cr—O series perpendicular magnetic recording layer is combined with the Fe—Al—Si alloy soft magnetic laminate layer, the magnetic flux distribution from recording head is improved and it becomes possible to derive more effectively the characteristics of the high Ku Co—Pt—Cr—O alloy. It should also be noted that, where the Fe—Al—Si alloy magnetic thin film is laminated, the surface of the thin film is made smoother. Therefore, where the Fe—Al—Si alloy magnetic laminate layer is used as a soft magnetic lining layer, the surface of the Co—Pt—Cr—O perpendicular magnetic recording layer is also made smoother. It should also be noted that a heat treatment is not necessary for the Co—Pt—Cr—O series perpendicular magnetic recording layer and the Fe—Al—Si alloy magnetic laminate layer to obtain excellent characteristics. By using the soft magnetic laminate layer as an underlayer of a double layered perpendicular magnetic recording medium GH (Glide Height) is suppressed in a low level easily. It should also be noted that, since a heat treatment is not applied, it is possible to form the magnetic laminate layer and the perpendicular magnetic recording layer on a nonmagnetic resin substrate, which is cheap and low in its heat resistance.

The present invention will now be described more in detail with reference to the accompanying drawings.

FIG. 1 shows an example of the magnetic recording medium 40 of the present invention using the first soft magnetic laminate layer. As shown in the drawing, the magnetic recording medium 40 comprises a nonmagnetic substrate 41, a soft magnetic laminate layer 45 consisting of a soft magnetic layer 42 formed on the nonmagnetic substrate 41 and having a thickness not larger than 500 Å and a nonmagnetic layer 43 formed on the soft magnetic layer 42, and a perpendicular recording layer 44 formed on the soft magnetic laminate layer 45. Each of the soft magnetic layer 42, the nonmagnetic layer 43 and the perpendicular recording layer 44 can be formed by a sputtering method.

Figure 2:
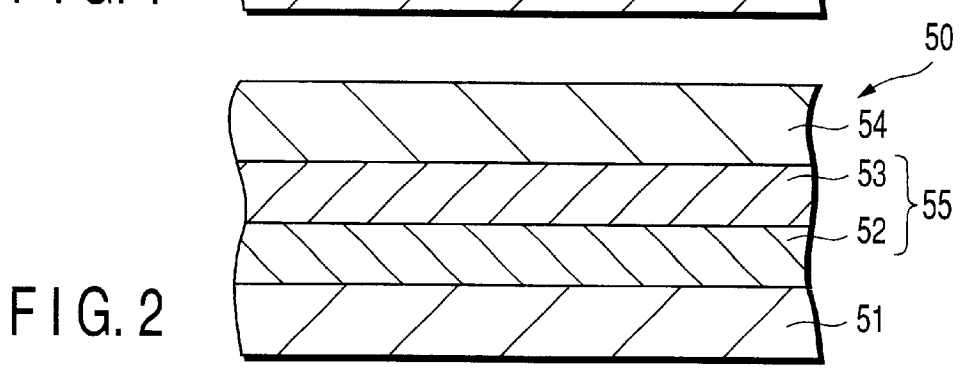
FIG. 2 is a view showing the construction of a second example of the magnetic recording medium of the present invention.

FIG. 2 shows an example of the magnetic recording medium 50 of the present invention using the soft magnetic laminate layer. As shown in the drawing, the magnetic recording medium 50 comprises a nonmagnetic substrate 51, a soft magnetic laminate layer 55 consisting of a first soft magnetic layer 52 formed on the nonmagnetic substrate 51 and a second soft magnetic layer 53 formed on the first soft magnetic layer 52, and a perpendicular recording layer 54 formed on the soft magnetic laminate layer 55. Each of the soft magnetic layer 52, the nonmagnetic layer 53 and the perpendicular recording layer 54 can be formed by a sputtering method.

Figure 3:
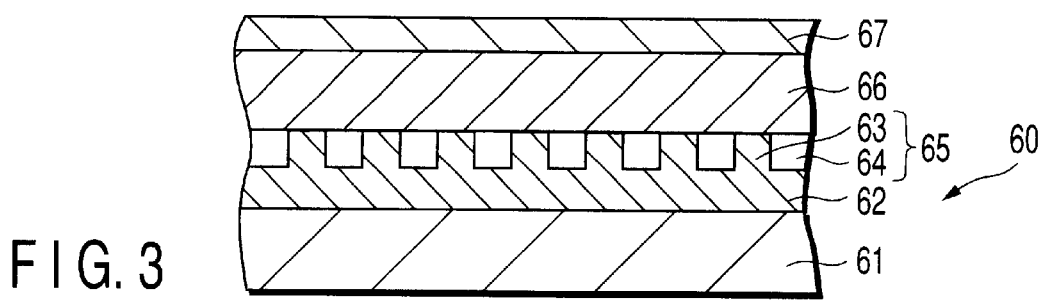
FIG. 3 is a view showing the construction of a third example of the magnetic recording medium of the present invention.

FIG. 3 shows as a model an example of a magnetic recording medium 60 of the present invention using the third soft magnetic laminate layer. As shown in the drawing, the magnetic recording medium 60 comprises: a nonmagnetic substrate 61, a third soft magnetic laminate layer including a soft magnetic layer 62 formed on the nonmagnetic substrate 61, and a granular layer 65 formed on the soft magnetic layer 62, which consists of magnetic particles 63 and a nonmagnetic matrix 64 surrounding the magnetic particles 63, a perpendicular magnetic recording layer 66 formed on the granular layer 65, and a protective layer 67 formed on the perpendicular magnetic recording layer 66.

Figure 4:
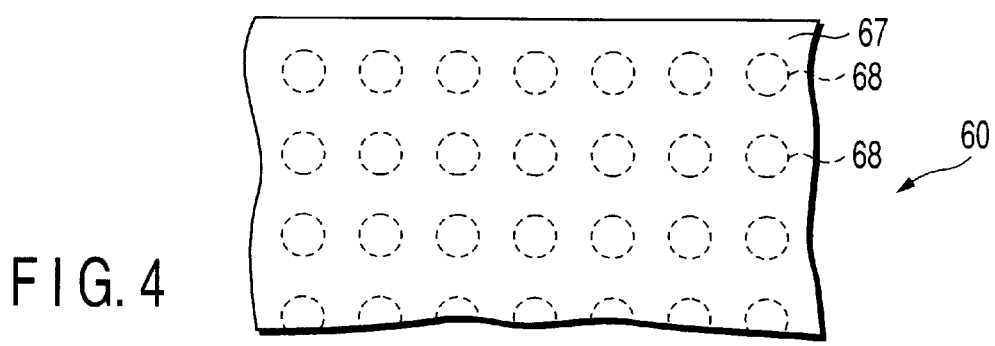
FIG. 4 is a view as observed from the side of the protective layer shown in FIG. 3.

FIG. 4 shows the model drawing of FIG. 3 as viewed from the side of the protective layer. The circles of broken lines 68 in FIG. 4 denote the positions where the magnetic particles 63 are present below the protective layer 67. FIG. 4 clearly shows that the magnetic particles 63 are surrounded by the nonmagnetic matrix 64 in the granular layer 65.

Figure 5:
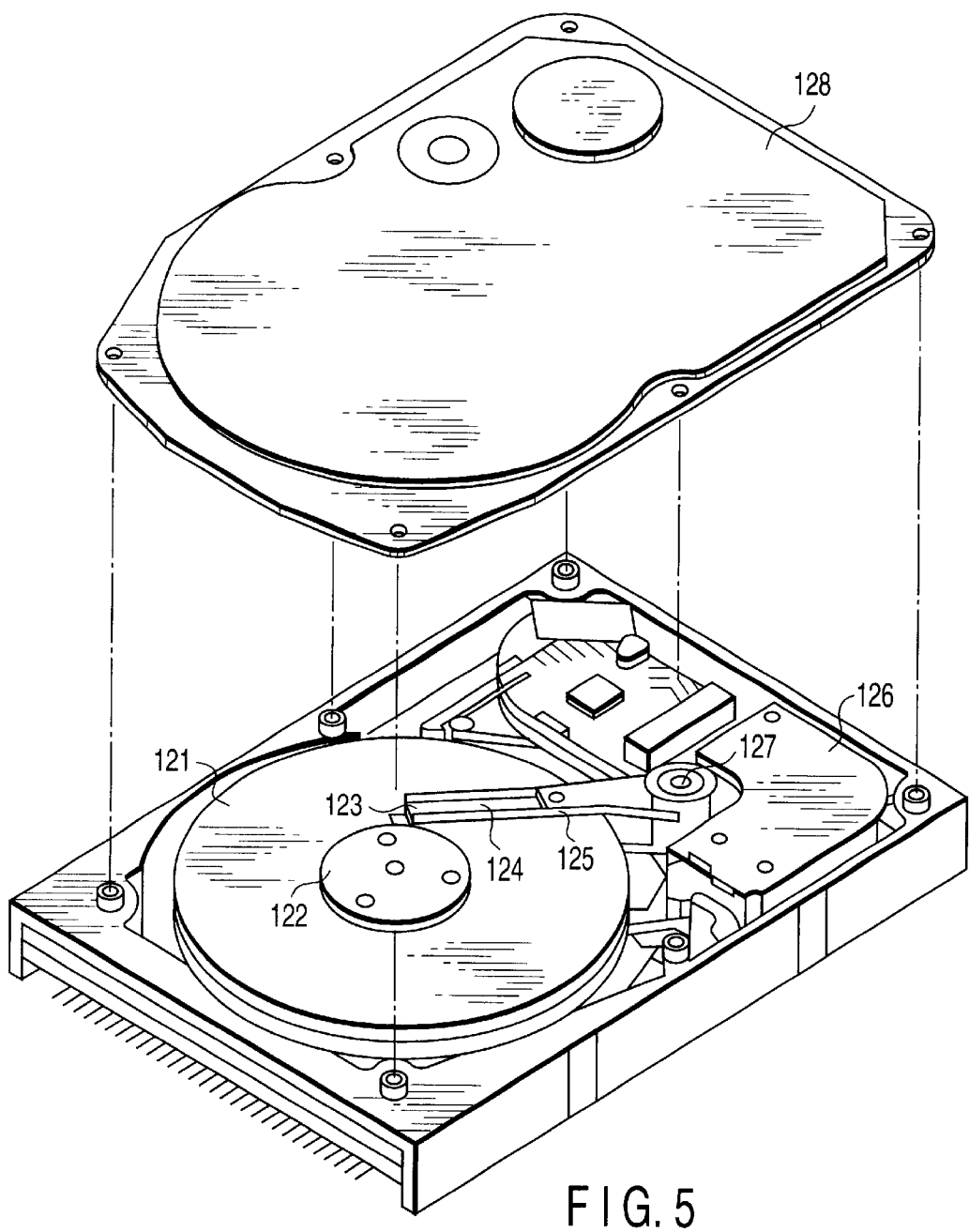
FIG. 5 is a view showing the construction of an example of the magnetic recording apparatus of the present invention.

FIG. 5 shows an example of the magnetic recording apparatus of the present invention. As shown in the drawing, a magnetic disc 121 of a hard structure for recording information is mounted to a spindle 122 and is rotated at a predetermined speed by a spindle motor (not shown). A slider 123 has a magnetic head is provided on the tip of a suspension 124 formed in a thin plate-like leaf spring which access to the magnetic disc 121 to read and write signals. The suspension 124 is connected to one end portion of an arm 125 having a bobbin etc. for holding a driving coil (not shown).

A voice coil motor 126, which is a kind of a linear motor, is mounted on the other end portion of the arm 125. The voice coil motor 126 comprises a driving coil (not shown) wound up to the bobbin portion of the arm 125 and a magnetic circuit consisting of a permanent magnet arranged to have the driving coil held therein and a yoke positioned to face the permanent magnet.

The arm 125 is held by ball bearings mounted in the upper and lower portions of a stationary shaft 127 so as to be rotated and swung by the voice coil motor 126. In other words, the position of the slider 123 on the magnetic disc 121 is controlled by the voice coil motor 126. Incidentally, a reference numeral 128 in FIG. 5 denotes a lid.

The present invention will now be described in detail with reference to Examples.

EXAMPLE 1

Figure 6:
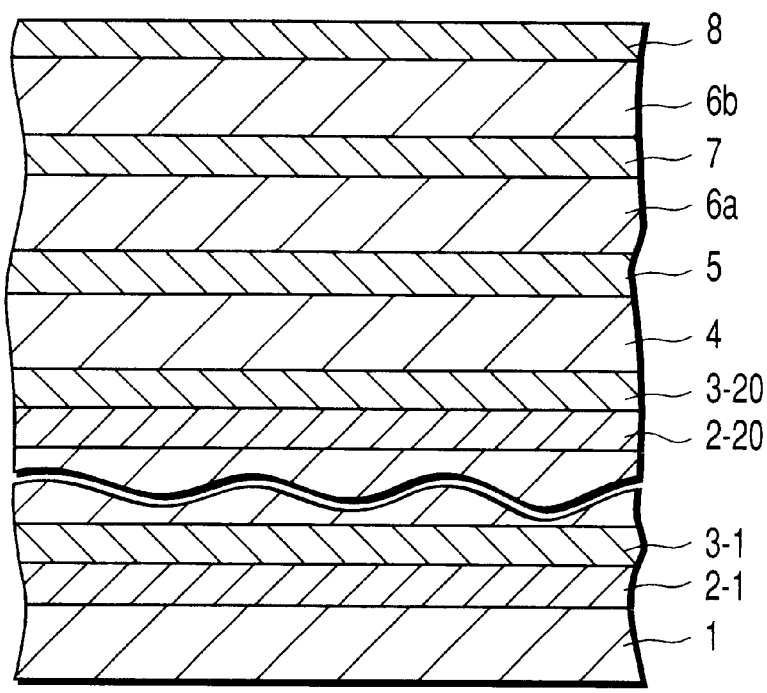
FIG. 6 is a view showing a fourth example of the magnetic recording medium of the present invention.

FIG. 6 shows sample 1 prepared by applying the first soft magnetic laminate layer.

Sample 1 was prepared as follows. In the first step, each target of Fe(11 atm %)-Al(17 atm %)-Si, C, Ti, Ru, and Co(20 atm %)-Pt(16 atm %)-Cr was put in a vacuum chamber evacuated to a vacuum of $2 \times 10^{-1}$ Pa. Each vacuum chamber was constructed to permit the medium to move from one chamber to another without being brought into the air atmosphere.

Then, a nonmagnetic glass substrate 1 was arranged to face the FeAlSi target, and sputtering was performed under the discharge of DC 1500W while allowing an Ar gas to flow into the vacuum chamber to set up a pressure of 0.5 Pa so as to form an FeAlSi soft magnetic film 2-1 having a thickness of 100 Å in one second. Further, the nonmagnetic glass substrate 1 was moved into another vacuum chamber while maintaining the vacuum condition and arranged to face a C target. Under this condition, sputtering was performed under the discharge of DC 1000W while allowing an Ar gas to flow into the vacuum chamber to set up a pressure of 0.5 Pa, thereby forming a C nonmagnetic layer 3-1 having a thickness of 40 Å in 5 minutes.

Similarly, FeAlSi soft magnetic layers 2-2 to 2-20 and C nonmagnetic films 3-2 to 3-20 were formed alternately so as to form an example of the first soft magnetic laminate layer consisting of FeAlSi films 2-1 to 2-20 and C films 3-1 to 3-20.

After formation of the laminate structure, the nonmagnetic glass substrate 1 was moved into another vacuum chamber while maintaining the vacuum condition and arranged to face a Ti target. Under this condition, sputtering was performed under the discharge of DC 1000W while allowing an Ar gas to flow into the vacuum chamber to set up a pressure of 0.5 Pa so as to form a Ti seed layer 4 having a thickness of 120 Å.

Further, the nonmagnetic glass substrate 1 was moved into another vacuum chamber while maintaining the vacuum condition and arranged to face a Ru target. Under this condition, sputtering was performed under the discharge of DC 1000W while allowing an Ar gas to flow into the vacuum chamber to set up a pressure of 0.5 Pa so as to form a Ru underlying layer 5 having a thickness of 500 Å.

Further, the nonmagnetic glass substrate 1 was moved into another vacuum chamber while maintaining the vacuum condition and arranged to face a CoPtCr target. Under this condition, sputtering was performed under the discharge of DC 250W while allowing an Ar gas containing 0.05% of $O_2$ to flow into the vacuum chamber to set up a pressure of 20 Pa so as to form a lower CoPtCrO perpendicular magnetic recording layer 6a having a thickness of 120 Å.

Then, the nonmagnetic glass substrate 1 was moved again into the vacuum chamber having the Ru target arranged therein while maintaining the vacuum condition and arranged to face the Ru target. Under this condition, sputtering was performed under the discharge of DC 250W this time while allowing an Ar gas to flow into the vacuum chamber to set up a pressure of 0.5 Pa so as to form a Ru nonmagnetic layer 7 having a thickness of 40 Å. Further, an upper CoPtCrO perpendicular magnetic recording layer 6b was formed on the Ru nonmagnetic layer 7 as in the formation of the lower CoPtCrO perpendicular recording layer 6a.

Finally, the nonmagnetic glass substrate 1 was arranged to face the C target, and the sputtering was performed under the discharge of DC 1000W while allowing an Ar gas to flow into the vacuum chamber to set up a pressure of 0.5 Pa so as to form a C protective layer 8 having a thickness of 70 Å. After completion of the film formation, the C protective layer 8 was coated with a PFPE lubricant in a thickness of 10 Å by a dipping method so as to obtain sample 1.

Comparative Example 1

Figure 7:
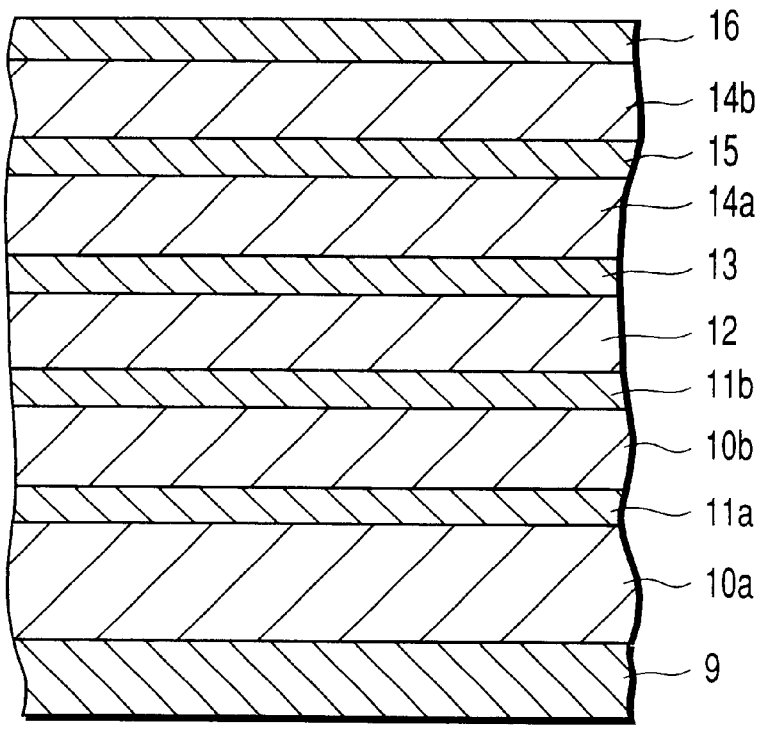
FIG. 7 is a view showing a first example of a magnetic recording medium for comparison.

FIG. 7 shows a medium according to Comparative Example 1.

A FeAlSi film 10a was formed on a nonmagnetic glass substrate 9 as in sample 1, except that the FeAlSi film 10a was formed in a thickness of 1,000 Å. Then, a C nonmagnetic layer 11a was formed on the FeAlSi film 10a as in Example 1. Further, an FeAlSi film 10b and a C nonmagnetic layer 11b were alternately formed on the C nonmagnetic layer 11a. Still further, a Ti seed layer 12, a Ru underlying layer 13, a lower CoPtCrO perpendicular magnetic recording layer 14a, a Ru nonmagnetic layer 15, an upper CoPtCrO perpendicular magnetic recording layer 14b, and a C protective layer 16 were formed as in Example 1, followed by coating the C protective layer 16 with a PFPE lubricant so as to obtain a conventional sample 2.

Comparative Example 2

Figure 8:
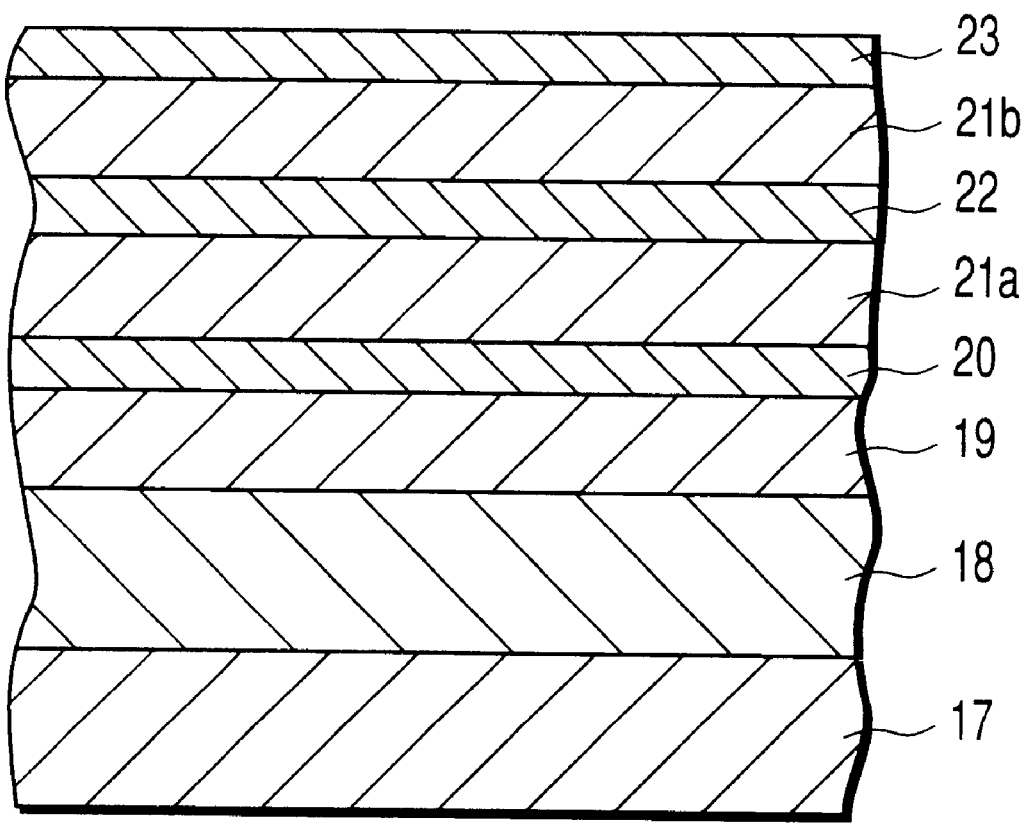
FIG. 8 is a view showing a second example of a magnetic recording medium for comparison.

FIG. 8 shows a medium according to Comparative Example 2.

Sputtering was performed as in Example 1, except that a CoZrNb film 18 was formed in a thickness of 2,000 Å by arranging a nonmagnetic glass substrate 17 to face a Co(6 atm %)-Zr(10 atm %)-Nb target in place of the Fe (11 atm %)-Al (17 atm %)-Si target used in Example 1.

Further, a Ti seed layer 19, a Ru underlying layer 20, a lower CoPtCrO perpendicular magnetic recording layer 21a, a Ru nonmagnetic layer 22, an upper CoPtCrO perpendicular magnetic recording layer 21b, and a C protective layer 23 were formed as in Example 1, followed by coating the C protective layer 23 with a PFPE lubricant so as to obtain a conventional sample 3.

An R/W test was applied to each of these samples 1, 2 and 3 by using the method of writing signals by using a single magnetic pole head and reading the signals by using an MR head so as to measure S/Nm and D50. The measurement was performed at a constant radial position of 20 mm from the center while rotating the disc at 4,200 rpm. Thus measured values of S/Nm and D50 are shown in Table 1.

Sample 1 for Example 1 was found to be superior to conventional samples 2 and 3 in each of S/Nm and D50. Particularly, fine noises covering the entire signal wave form were generated as a white noise in sample 2. Also, abrupt spike noises were found to have been generated in sample 3. On the other hand, a noise was not generated in sample 1 for Example 1.

Since samples 1, 2 and 3 were equal to each other in the recording layer, the noise is considered to have been generated from the soft magnetic layer positioned below the recording layer. Such being the situation, the soft magnetic layers alone were formed for comparison of the noise generation after the DC erasing.

Figure 9:
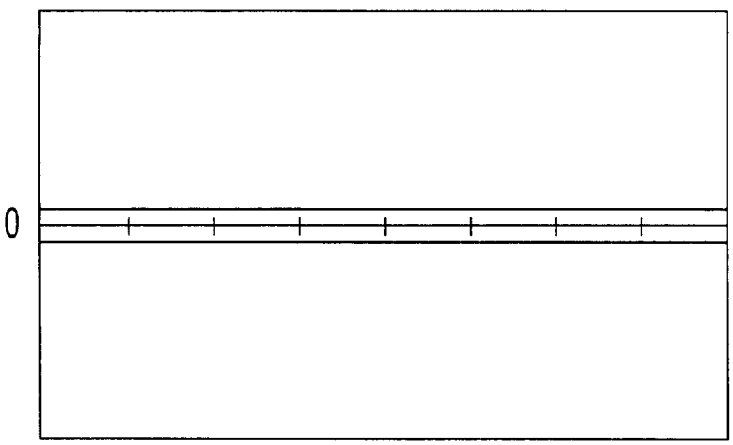
FIG. 9 is a graph showing the wave form obtained by measuring the noise of the soft magnetic layer.
Figure 10:
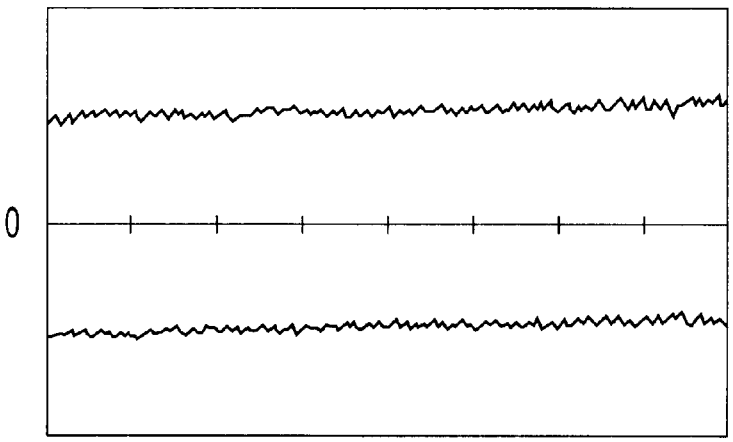
FIG. 10 is a graph showing the wave form obtained by measuring the noise of the soft magnetic layer.
Figure 11:
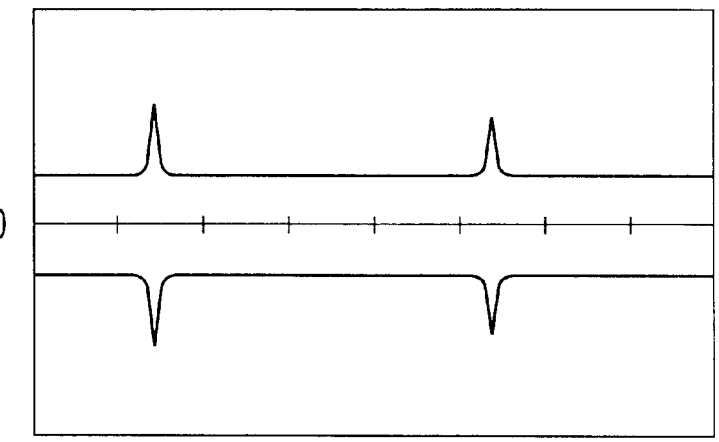
FIG. 11 is a graph showing the wave form obtained by measuring the noise of the soft magnetic layer.

FIGS. 9 to 11 show wave forms of the noises for samples 1, 2 and 3, respectively. As shown in FIG. 9, a noise is not observed in the case where the FeAlSi thin films 2 and the nonmagnetic layers 3 alone were alternately laminated one upon the other as in sample 1. However, a white noise is observed in the case where the FeAlSi thin films 10 and the C nonmagnetic layers 11 alone were alternately laminated one upon the other as in sample 2. Further, spike noises were observed in the case where the CoZrNb films 18 alone was laminated as in sample 3.

The state of magnetization was observed with an MFM in respect of the laminate structure of these soft magnetic layers. The domain wall was not observed in sample 1. However, domain walls forming domains of 0.31 μm were observed in sample 2. Further, domain walls forming domains of the size that cannot be observed were observed in sample 3.

Also, the noise after the DC erasing was compared in respect of the soft magnetic layer prepared by laminating a single FeAlSi thin film 2 and a single nonmagnetic layer 3 for sample 1. It has been found that the noise has a wave form similar to that shown in FIG. 9, supporting that the effect of preventing the noise generation can be produced by only a single layer. Further, the state of magnetization was similarly observed with an MFM in respect of the soft magnetic layer prepared by laminating a single FeAlSi thin film 2 and a single nonmagnetic layer 3 for sample 1. It has been found that a domain wall was not formed in this case. In other words, it has been found that the noise can be suppressed to a low level even in the case where the soft magnetic laminate layer consists of a single FeAlSi thin film 2 and a single nonmagnetic layer 3, making it possible to laminate 20 thin films 2 and 20 nonmagnetic layers 3 without amplifying the noise.

Further, the domain wall was observed over the entire medium surface by the principle of Kerr effect by using an OSA (Optical Surface Analyzer) apparatus for observing the reflection of the laser light onto the entire surface of the medium. A domain wall was not observed in sample 1 in this case, too. However, domain walls dividing the medium surface into several regions were observed in sample 3. These domain walls are considered to cause the white noise and the spike noise.

Also, the values of Ms of these three soft magnetic film portions alone were measured by using a VSM (Vibrating Sample Magnetometer) without taking the volume of the nonmagnetic intermediate layer into consideration. It has been found that the value of Ms for sample 1 was 580 emu/cc, which was about 80% of the theoretical bulk value of FeAlSi. Also, the value of Ms for sample 2 was found to be 720 emu/cc, which was substantially equal to the theoretical value of FeAlSi. Further, the value of Ms for sample 3 was found to be 1070 emu/cc, which was substantially equal to the theoretical value of CoZrNb.

As described above, the magnetic recording medium prepared in Example 1 included the soft magnetic thin film that does not generate noise.

EXAMPLE 2

Figure 12:
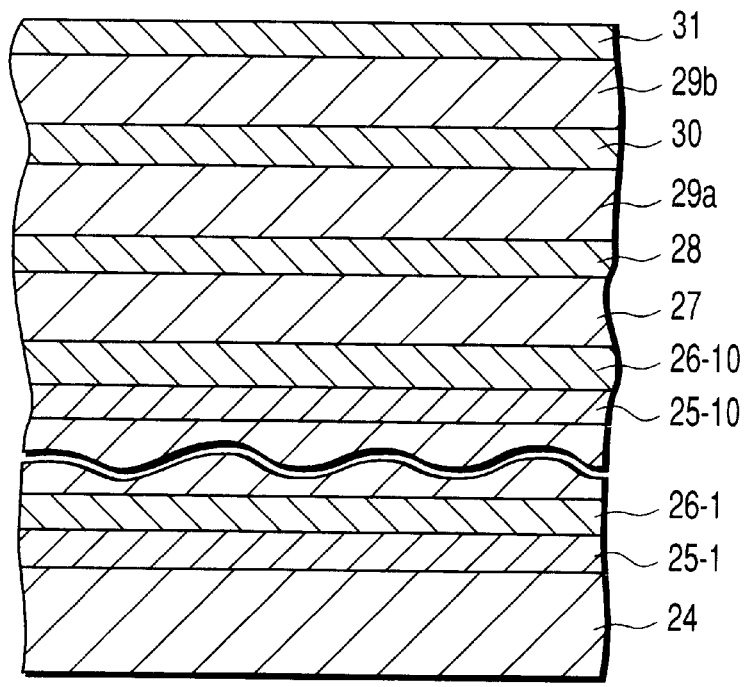
FIG. 12 is a view showing a fifth example of the magnetic recording medium of the present invention.

FIG. 12 shows a sample 4 comprising the second soft magnetic laminate layer.

In preparing the magnetic recording medium of sample 4, a soft magnetic laminate layer was formed as in Example 1, except that a CoZrNb target for forming a soft magnetic layer was used in place of the C target used in Example 1 for forming a nonmagnetic layer, and that FeAlSi thin films 25-1 to 25-10 each having a thickness of 4 nm and CoZrNb thin films 26-1 to 26-10 each having a thickness of 4 nm were alternately laminated to form an example of the second soft magnetic laminate layer instead of the first magnetic laminate layer. Further, a Ti seed layer 27, a Ru underlying layer 28, a lower CoPtCrO perpendicular recording layer 29a, a Ru nonmagnetic layer 30, an upper CoPtCrO perpendicular recording layer 29b, and a C protective layer 31 were formed, followed by coating the C protective layer 31 with a PFPE lubricant so as to obtain sample 4.

Sample 4 thus prepared widely differs from sample 1 in that the FeAlSi thin films 25-1 to 25-10 and the CoZrNb thin films 26-1 to 26-10 are soft magnetic layers differing from each other in crystal structure.

These two layers were independently formed and the XRD (X-ray diffraction) patterns of these films were examined under the conditions of Cu-Kα and 2θ=30 to 70°. A peak that is considered to be the (220) plane of a cubic lattice appeared about 45° in the FeAlSi thin film. However, only a broad peak appeared on the order of 40° in the CoZrNb intermediate layer, indicating that the CoZrNb intermediate layer was amorphous.

A R/W test was applied as in Example 1 to sample 4 thus prepared. Table 1 shows the results.

Noise was not observed in the actual R/W wave form and in the noise measurement of the soft magnetic laminate film as in Example 1.

EXAMPLE 3

Figure 13:
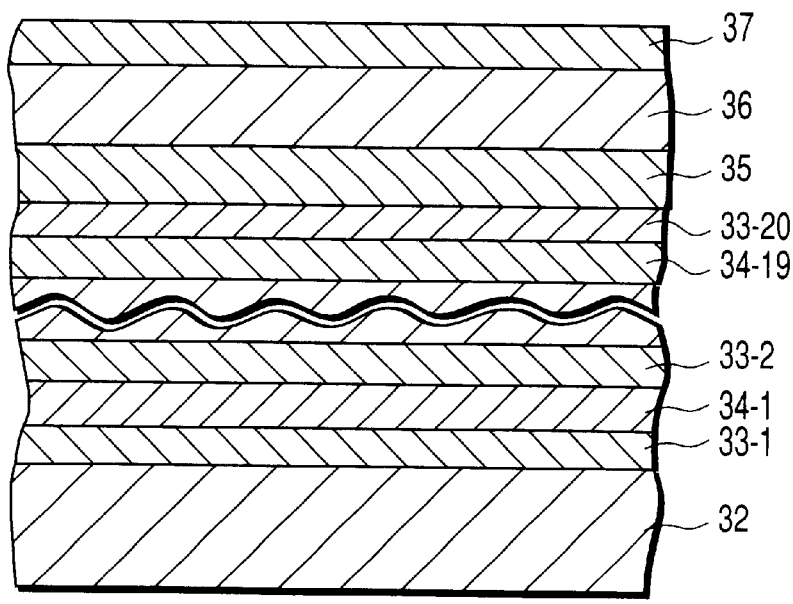
FIG. 13 is a view showing a sixth example of the magnetic recording medium of the present invention.

FIG. 13 shows sample 5 prepared by using another example of the first soft magnetic laminate layer. Sample 5 was prepared as follows. Specifically, CoZrNb soft magnetic layer 33-1 to 33-20 each having a thickness of 20 nm and Ti nonmagnetic layers 34-1 to 34-19 each having a thickness of 7 nm were alternately laminated alternately to form another example of the first soft magnetic laminated layer on a nonmagnetic substrate 32. Then, a Ti seed layer 35, which was the uppermost Ti nonmagnetic layer, was formed on the uppermost CoZrNb thin film 33-20, followed by forming a CoCrTa perpendicular magnetic recording layer 36 on the Ti seed layer 35. Further, a C protective layer 37 was formed on the CoCrTa perpendicular magnetic recording layer 36 so as to prepare sample 5 of the magnetic recording medium.

A R/W test was applied to sample 5 as in Example 1. The results are shown in Table 1.

TABLE 1

|  |  | S/Nm (dB) | D50 (kFCI) |
|---|---|---|---|
| Example 1 | Sample 1 | 30.2 | 361 |
| Comparative Example 1 | Sample 2 | 18.6 | 253 |
| Comparative Example 2 | Sample 3 | 21.4 | 248 |
| Example 2 | Sample 4 | 31.0 | 370 |
| Example 3 | Sample 5 | 29.7 | 348 |

Table 1 clearly shows that the perpendicular magnetic recording medium prepared in, for example, Example 1, exhibits large values of S/Nm and D50.

The perpendicular magnetic recording medium prepared in Example 2, i.e., sample 4, was found to be somewhat superior to sample 1 in each of S/Nm and D50. Further, where the magnetic thin films and magnetic intermediate layers differing from the magnetic thin film in the crystallinity were used for forming the laminated soft magnetic layer, the resultant perpendicular magnetic recording medium was found to exhibit S/Nm and D50 fully comparable with those of the perpendicular magnetic recording medium prepared by using a laminate layer consisting of magnetic thin films and nonmagnetic thin films, though the number of laminated layers or films in the case of using the magnetic intermediate layers is smaller than that in the case of using nonmagnetic thin films.

However, the perpendicular magnetic recording medium prepared in each of Comparative Examples 1 and 2 was found to be insufficient in each of the S/Nm value and the D50 value.

EXAMPLES 4 TO 10 AND COMPARATIVE EXAMPLE 3 TO 8

Samples 6 to 11 comprising the third soft magnetic laminate layer will now be described with reference to FIG. 3.

In the first step, a 2.5 inch glass substrate 61 was prepared as nonmagnetic substrate. Also $Co_{80}Fe_{20}$ target was prepared for the soft magnetic layer 62. Further a $Co_{80}Fe_{20}TiN$ composite target was prepared, adjusted such that the volume ratio after the film formation of $Co_{80}Fe_{20}$ for forming the magnetic particles 63 to the TiN for forming the nonmagnetic matrix 64 would be 60:40.

Then, a continuous soft magnetic layer 62 having a thickness of 50 nm was formed on each glass substrate 61 by an opposed stationary magnetron sputtering method under an Ar gas atmosphere, DC power 1000W, by using the $Co_{80}Fe_{20}$ target. Further, granular layers having a variety of thickness such as 10, 50, 100, 200, 400, and 600 nm were formed, respectively, as shown in a granular layer 65 by an opposed stationary magnetron sputtering method by using the $Co_{80}Fe_{20}$-TiN composite target. Each $CoPt_{20}Cr$ film having a thickness of 50 nm is formed as the perpendicular magnetic recording layer 66 by an opposed stationary magnetron sputtering method under a mixed gas prepared by adding traces of oxygen to an Ar gas using the $CoPt_{20}Cr_{16}$ alloy target. Finally, the C protective film 67 was formed in a thickness of 8 nm on each perpendicular magnetic recording layer 66. Samples 6 to 11 of the perpendicular magnetic recording media were obtained.

Samples 12 to 17 corresponding to Comparative Examples 3 to 8 were prepared by forming the granular layers in a thickness of 10 nm, 50 nm, 100 nm, 200 nm, 400 nm and 600 nm, respectively, as in Examples 4 to 10, except that the continuous soft magnetic layer was not formed on the substrate.

The relationship between the magnetic characteristics and the film structure of the resultant perpendicular magnetic recording medium was studied. Specifically, the magnetic characteristics of the film formed were examined by a VSM (Vibrating Sample Magnetometer), and the film structure was examined by using a TEM (Transmission Electron Spectroscopy). The value of $S_0$/NmRMS when the recording was performed at a recording density of 250 Kfci was measured by using a GMR head having a read gap length of 0.5 μm and a read track width of 0.8 μm, a single magnetic pole head having a main magnetic pole film thickness of 0.4 μm and a write track width of 2 μm, using a spin stand having the spacing between a medium and a head is 40 nm.

Figure 14:
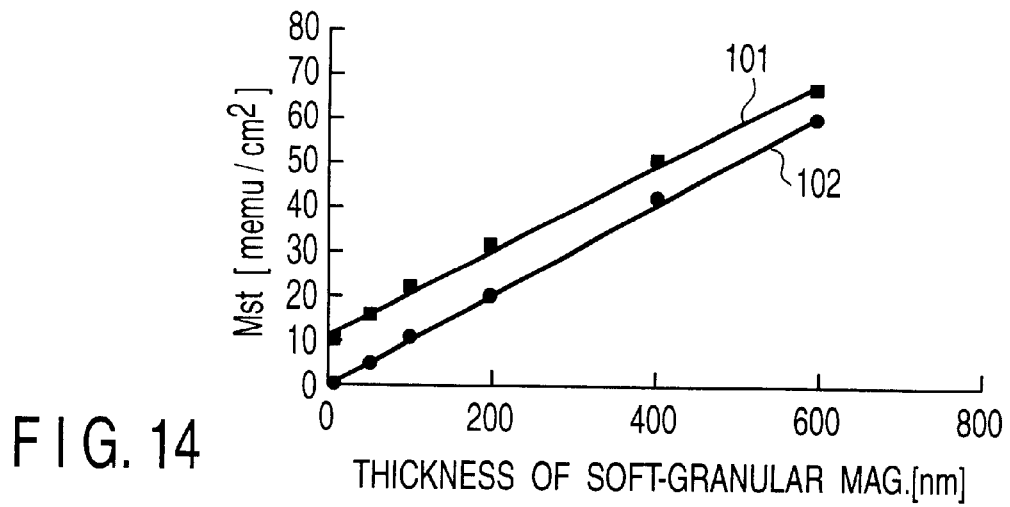
FIG. 14 is a graph showing the relationship between the saturation magnetization Ms and the thickness of the soft magnetic laminate layer.

FIG. 14 is a graph showing the relationship between the saturation magnetization Ms granular+bulk of the entire recording layer and the thickness of the soft magnetic laminate layer and a single granular layer of the perpendicular magnetic recording medium thus prepared a line 101 including six dots on the line according to Examples 4 to 10, and a line 102 including six dots on line according to Comparative Examples 3 to 8.

Also, the noise was measured.

Figure 15:
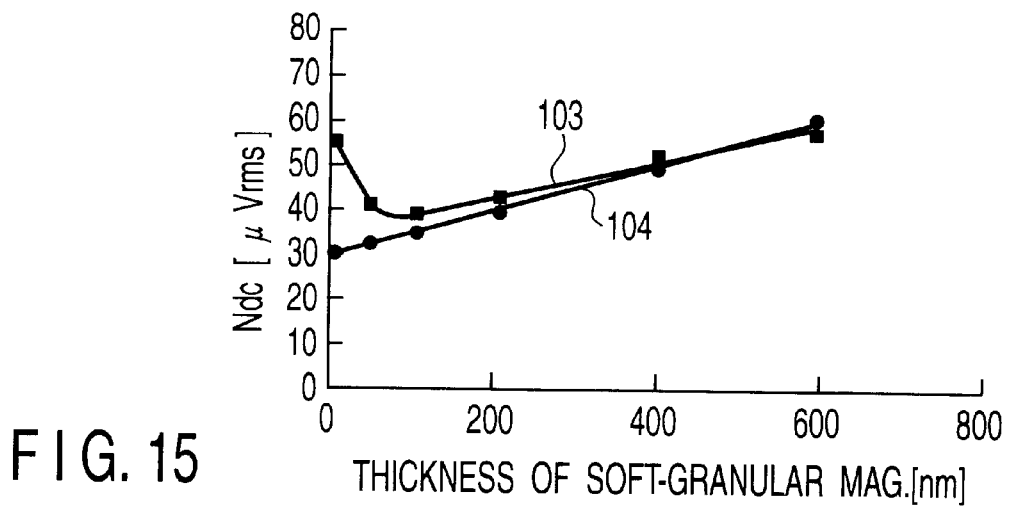
FIG. 15 is a graph showing the relationship between the DC noise and the thickness of the soft magnetic laminate layer.

FIG. 15 is a graph showing the relationship between the DC noise after DC erasing and the thickness of the soft magnetic laminate layer with and without continuous soft magnetic layer. A line 103 relates to Examples, and a line 104 relates to Comparative Examples.

As apparent from FIG. 15, the noise of the perpendicular magnetic recording medium using the granular layer alone has been found to increase simply with increase in the film thickness. On the other hand, in the perpendicular magnetic recording medium in which the continuous soft magnetic layer was formed below the granular layer, the noise of media, in which the thickness of the granular layer was 10 nm, was found to be about two times as high as the noise of sample using the granular layer alone.

The experimental data suggest that the influence of noise derived from the continuous soft magnetic layer formed below the granular layer appears greatly. It is considered reasonable to understand that, in the case of the thinner granular layer, the noise from the continuous soft magnetic layer formed below the granular layer effects on the noise of media. It is also considered reasonable to understand that, where the granular layer is thicker, the noise of the granular layer would be predominant.

It is considered reasonable to understand that the desirable film thickness is determined by the value of BS, the permeability, the thickness of the soft magnetic laminate layer, and the content of volume of the magnetic particles within the granular layer, etc.

Figure 16:
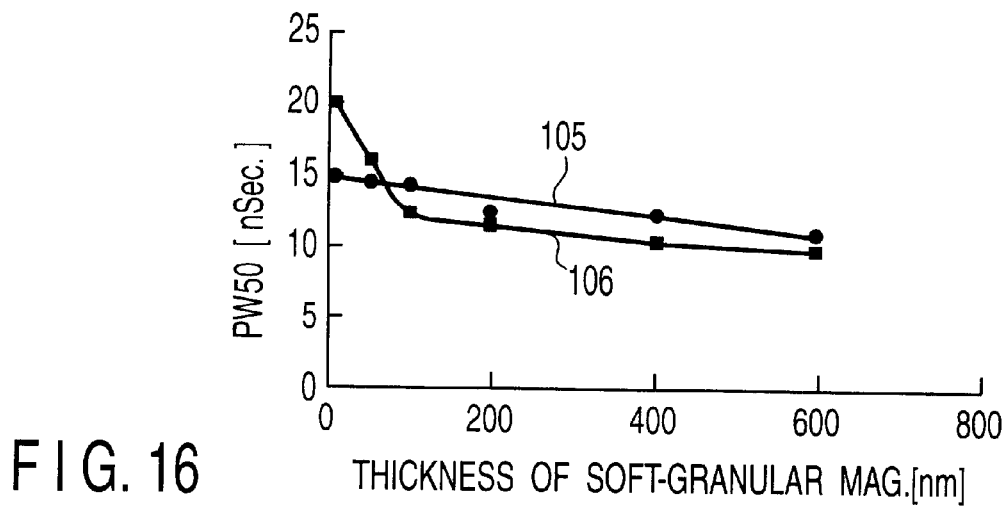
FIG. 16 is a graph showing the relationship between the resolution of the perpendicular recording medium and the thickness of the soft magnetic laminate layer.

Then, the differential $PW_{50}$ was obtained for each of the perpendicular recording media described above when the media was recorded at 250 kfci of a recording density. FIG. 16 is a graph showing the relationship between $PW_{50}$ thus obtained and the thickness of the soft magnetic laminate layer. A line 105 relates to Comparative Examples, and a line 106 relates to Examples.

The differential value of $PW_{50}$ of the soft magnetic laminate layer was significantly increased at the thickness of not larger than 100 nm. It is considered that this results from significant appearance of an influence of the continuous soft magnetic layer. The differential value of $PW_{50}$ of the soft magnetic laminate layer having a thickness except for the above range was smaller in comparison with the differential value of $PW_{50}$ of the single granular layer. It is considered because of a desired magnetization conversion that is caused by laminating of the continuous soft magnetic layer, a mirror image effect and an effect of controlling magnetic flux would be taken when recording.

A soft magnetic granular layer was formed by the same way as the steps of forming above perpendicular magnetic recording medium except for using RF magnetron spattering method with a composite target containing $SiO_2$ as a nonmagnetic matrix and CoFe as a magnetic particles to obtain a soft magnetic laminate layer.

The DC noise is measured for the media without magnetic recording layer. The differential $PW_{50}$ is measured for a perpendicular magnetic recording medium comprising the obtained soft magnetic laminate layer and further comprising a magnetic layer similar to the above magnetic layer on the laminate layer. The result was similar to that of the perpendicular magnetic recording medium having the granular layer including TiN as a nonmagnetic matrix.

However when the recording density is increased to 500 kfci, the value of the DC noise and the differential $PW_{50}$ become a somewhat larger than the value of the media having the granular layer including TiN as a nonmagnetic matrix. And when a frequency is higher, it was found that the noise of media with the granular longer became larger.

The experimental data suggest that, in the case of the perpendicular magnetic recording medium using TiN having a low resistivity for forming the nonmagnetic matrix, an eddy current generated under a high frequency makes the recording insufficient, and that, in the case of the perpendicular magnetic recording medium using $SiO_2$ having a high resistivity for forming the nonmagnetic matrix, the generation of the eddy current is suppressed so as to achieve a sufficient recording.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording medium comprising:
a nonmagnetic substrate;
a perpendicular magnetic recording layer for recording signal; and
a soft magnetic laminate layer formed between said nonmagnetic substrate and said perpendicular magnetic recording layer for recording signal, and including at least two soft magnetic layers and a nonmagnetic layer interposed therebetween, each of said soft magnetic layers having a thickness not larger than 500 Å, wherein the value of the saturation magnetization per layer of said soft magnetic layer is not larger than 90% of the saturation magnetization value under a bulk state.

2. The magnetic recording medium according to claim 1, wherein the thickness of said nonmagnetic layer is not larger than 1.5 times the thickness of said soft magnetic layer.

3. The magnetic recording medium according to claim 1, wherein said soft magnetic layer contains at least one element selected from the group consisting of Fe, Co and Ni.

4. The magnetic recording medium according to claim 1, wherein said nonmagnetic layer is formed of at least one element selected from the group consisting of B, C, Ti, Si, Al, Cr, Ru, Zr, Nb, and Ta.

5. The magnetic recording medium according to claim 1, wherein said soft magnetic layer is formed of an Fe—Al—Si alloy layer.

6. The magnetic recording medium according to claim 1, wherein said perpendicular magnetic recording layer is formed of at least one layer of a Co—Pt—Cr—O series magnetic thin film.

7. A magnetic recording medium comprising:
a nonmagnetic substrate;
a perpendicular magnetic recording layer; and
a soft magnetic laminate layer formed between the nonmagnetic substrate and the perpendicular magnetic medium, and including a soft magnetic granular layer formed of a nonmagnetic matrix and soft magnetic metal particles dispersed in said matrix, and a soft magnetic layer.

8. A magnetic recording medium according to claim 7, wherein said soft magnetic granular layer and said soft magnetic layer are arranged in order in a direction taken from said perpendicular magnetic recording layer and toward said nonmagnetic substrate.

9. The magnetic recording medium according to claim 7, wherein said the magnetic particles of soft magnetic layer contains as its largest component at least one element selected from the group consisting of Fe, Co and Ni.

10. The magnetic recording medium according to claim 7, wherein said nonmagnetic matrix of the granular layer comprises at least one nonmagnetic material selected from the group consisting of: Ag, Ti, Ru, C, and compounds thereof, $SiO_2$, SiG, $Si_3N_4$, $Al_2O_3$, AN, TiN, BN, CaF and TiC.

11. A magnetic recording apparatus, comprising:
a magnetic recording medium having a nonmagnetic substrate, a perpendicular magnetic recording layer for recording signal, and a soft magnetic laminate layer formed between said nonmagnetic substrate and said perpendicular magnetic recording layer for recording signal, and including at least two soft magnetic layers and a nonmagnetic layer interposed therebetween, each of said soft magnetic layers having a thickness not larger than 500 Å;
driving means supporting and rotating the perpendicular magnetic recording medium;
a magnetic head including an element for recording information in the perpendicular magnetic recording medium and another element for reading the recorded information; and
a carriage assembly supporting the magnetic head such that the magnetic head is movable relative to the magnetic recording medium, wherein the value of the saturation magnetization per layer of said soft magnetic layer is not larger than 90% of the saturation magnetization value under a bulk state.

12. A magnetic recording apparatus comprising:

a magnetic recording medium having a nonmagnetic substrate, a perpendicular magnetic recording layer, a soft magnetic laminate layer formed between the nonmagnetic substrate and the perpendicular magnetic medium, and including a soft magnetic granular layer formed of a nonmagnetic matrix and soft magnetic metal particles dispersed in said matrix, and a soft magnetic layer;

driving means supporting and rotating the perpendicular magnetic recording medium;

a magnetic head including an element for recording information in the perpendicular magnetic recording medium and another element for reading the recorded information; and a carriage assembly supporting the magnetic head and making the magnetic head be movable relative to the magnetic recording medium.

13. A magnetic recording medium comprising:

a nonmagnetic substrate;

a perpendicular magnetic recording layer for recording signal; and a soft magnetic laminate layer formed between said nonmagnetic substrate and said perpendicular magnetic recording layer for recording signal, and including at least two soft magnetic layers and a nonmagnetic layer interposed therebetween, each of said soft magnetic layers having a thickness not larger than 500 Å, wherein said perpendicular magnetic recording layer is formed of at least one layer of a Co—Pt—Cr—O series magnetic thin film.

14. The magnetic recording medium according to claim 13, wherein the thickness of said nonmagnetic layer is not larger than 1.5 times the thickness of said soft magnetic layer.

15. The magnetic recording medium according to claim 13, wherein said soft magnetic layer contains at least one element selected from the group consisting of Fe, Co and Ni.

16. The magnetic recording medium according to claim 13, wherein said nonmagnetic layer is formed of at least one element selected from the group consisting of B, C, Ti, Si, Al, Cr, Ru, Zr, Nb, and Ta.

17. The magnetic recording medium according to claim 13, wherein said soft magnetic layer is formed of an Fe—Al—Si alloy layer.

18. A magnetic recording apparatus, comprising:

a magnetic recording medium having a nonmagnetic substrate, a perpendicular magnetic recording layer for recording signal, and a soft magnetic laminate layer formed between said nonmagnetic substrate and said perpendicular magnetic recording layer for recording signal, and including at least two soft magnetic layers and a nonmagnetic layer interposed therebetween, each of said soft magnetic layers having a thickness not larger than 500 Å;

driving means supporting and rotating the perpendicular magnetic recording medium;

a magnetic head including an element for recording information in the perpendicular magnetic recording medium and another element for reading the recorded information; and a carriage assembly supporting the magnetic head such that the magnetic head is movable relative to the magnetic recording medium, wherein said perpendicular magnetic recording layer is formed of at least one layer of a Co—Pt—Cr—O series magnetic thin film.

* * * * *